(12) United States Patent
Rassam et al.

(10) Patent No.: US 12,156,242 B2
(45) Date of Patent: Nov. 26, 2024

(54) INTERFERENCE MITIGATION OF STRONG NEIGHBOR CELL NON-COLLIDING CRS

(71) Applicant: QUALCOMM Incorporated, San Diego, CA (US)

(72) Inventors: Faris Rassam, El Cajon, CA (US); Hobin Kim, San Diego, CA (US); Hari Sankar, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/478,026

(22) Filed: Sep. 17, 2021

(65) Prior Publication Data

US 2022/0086844 A1 Mar. 17, 2022

Related U.S. Application Data

(60) Provisional application No. 63/126,884, filed on Dec. 17, 2020, provisional application No. 63/079,659, filed on Sep. 17, 2020.

(51) Int. Cl.
*H04W 72/541* (2023.01)
*H04L 5/00* (2006.01)

(52) U.S. Cl.
CPC ......... *H04W 72/541* (2023.01); *H04L 5/0048* (2013.01)

(58) Field of Classification Search
CPC .. H04W 72/541; H04W 24/10; H04L 5/0048; H04L 1/0069
See application file for complete search history.

(56) References Cited

U.S. PATENT DOCUMENTS

| 11,910,219 B2* | 2/2024 | Takeda | H04W 24/10 |
|---|---|---|---|
| 11,924,760 B2* | 3/2024 | Seo | H04W 72/0446 |
| 2015/0207601 A1* | 7/2015 | Kim | H04L 5/0073 370/329 |
| 2019/0141696 A1* | 5/2019 | Kim | H04L 5/0055 |
| 2020/0358481 A1* | 11/2020 | Huss | H04W 72/23 |
| 2022/0360998 A1* | 11/2022 | Park | H04L 5/005 |
| 2022/0400391 A1* | 12/2022 | Ryu | H04L 5/0055 |

FOREIGN PATENT DOCUMENTS

WO WO-2014025139 A1 * 2/2014 .......... H04L 5/0035

* cited by examiner

*Primary Examiner* — Mounir Moutaouakil
(74) *Attorney, Agent, or Firm* — Patterson + Sheridan, LLP

(57) ABSTRACT

Aspects of the present disclosure relate to wireless communications, and more particularly, to techniques for mitigating interference caused by legacy reference signals from neighbor cells (e.g., LTE cell-specific reference signals) to non-legacy downlink transmissions in a serving cell (e.g., NR/5G PDSCH transmissions).

27 Claims, 13 Drawing Sheets

| | | |
|---|---|---|
| maxNrofNZP-CSI-RS-Resources | INTEGER ::= 192 | -- Maximum number of Non-Zero-Power (NZP) CSI-RS resources |
| maxNrofNZP-CSI-RS-Resources-1 | INTEGER ::= 191 | -- Maximum number of Non-Zero-Power (NZP) CSI-RS resources minus 1 |
| maxNrofNZP-CSI-RS-ResourcesPerSet | INTEGER ::= 64 | -- Maximum number of NZP CSI-RS resources per resource set |
| maxNrofNZP-CSI-RS-ResourceSets | INTEGER ::= 64 | -- Maximum number of NZP CSI-RS resources per cell |
| maxNrofNZP-CSI-RS-ResourceSets-1 | INTEGER ::= 63 | -- Maximum number of NZP CSI-RS resources per cell minus 1 |
| maxNrofNZP-CSI-RS-ResourceSetsPerConfig | INTEGER ::= 16 | -- Maximum number of resource sets per resource configuration |
| maxNrofNZP-CSI-RS-ResourceSetsPerConfig | INTEGER ::= 128 | -- Maximum number of resources per resource configuration |
| maxNrofZP-CSI-RS-Resources | INTEGER ::= 32 | -- Maximum number of Zero-Power (ZP) CSI-RS resources |
| maxNrofZP-CSI-RS-Resources-1 | INTEGER ::= 31 | -- Maximum number of Zero-Power (ZP) CSI-RS resources minus 1 |
| maxNrofZP-CSI-RS-ResourceSetsPerSet | INTEGER ::= 16 | |
| maxNrofZP-CSI-RS-ResourceSets | INTEGER ::= 16 | |
| maxNrofCSI-IM-Resources | INTEGER ::= 32 | -- Maximum number of CSI-IM resources. See CSI-IM-ResourceMax in 38.214. |
| maxNrofCSI-IM-Resources-1 | INTEGER ::= 31 | -- Maximum number of CSI-IM resources minus 1. See CSI-IM-ResourceMax -- in 38.214. |
| maxNrofCSI-IM-ResourcesPerSet | INTEGER ::= 8 | -- Maximum number of CSI-IM resources per set. See CSI-IM-ResourcePerSetMax -- in 38.214 |
| maxNrofCSI-IM-ResourceSets | INTEGER ::= 64 | -- Maximum number of NZP CSI-IM resources per cell |
| maxNrofCSI-IM-ResourceSets-1 | INTEGER ::= 63 | -- Maximum number of NZP CSI-IM resources per cell minus 1 |
| maxNrofCSI-IM-ResourceSetsPerConfig | INTEGER ::= 16 | -- Maximum number of CSI IM resource sets per resource configuration |

FIG. 5A

| |
|---|
| lte-CRS-PatternList |
| A list of LTE CRS patterns around which the UE shall do rate matching for PDSCH. The LTE CRS patterns in this list shall be non-overlapping in frequency. The network does not configure this field and *lte-CRS-ToMatchAround* simultaneously. |
| lte-CRS-PatternList2 |
| A list of LTE CRS patterns around which the UE shall do rate matching for PDSCH scheduled with a DCI detected on a CORESET with CORESETPoolIndex configured with 1. This list is configured only if CORESETPoolIndex configured with 1. The first LTE CRS pattern in this list shall be fully overlapping in frequency with the first LTE CRS pattern in lte-CRS-PatternList. The second LTE CRS pattern in this list shall be fully overlapping in frequency with the second LTE CRS pattern in lTe-CRS-PatternList, and so on. Network configures this field only if the field *lte-CRS-ToMatchAround* is not configured and there is at least one ControlResourceSet in one DL BWP of this serving cell with *coresetPoolIndex* set to 1. |

FIG. 5B maxNrofZP-CSI-RS-Resources INETEGER ::= 32 -- Maximum number of Non-Zero-Power (ZP) CSI-RS resources
maxNrofZP-CSI-RS-Resources-1 INETEGER ::= 31 -- Maximum number of Non-Zero-Power (ZP) CSI-RS resources minus 1
maxNrofZP-CSI-RS-ResourceSets-1 INETEGER ::= 15
maxNrofZP-CSI-RS-ResourcesPerSet INETEGER ::= 16
maxNrofZP-CSI-RS-ResourceSets INETEGER ::= 16

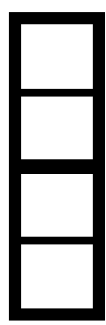 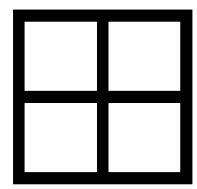
Pattern 1    Pattern 0
Two possible CSI-IM patterns
FIG. 13

INTERFERENCE MITIGATION OF STRONG NEIGHBOR CELL NON-COLLIDING CRS

CROSS-REFERENCE TO RELATED APPLICATION(S)

This application claims benefit of and priority to U.S. Provisional Application No. 63/079,659, filed Sep. 17, 2020 and U.S. Provisional Application No. 63/126,884, filed Dec. 17, 2020, both of which are hereby assigned to the assignee hereof and hereby expressly incorporated by reference herein in their entirety as if fully set forth below and for all applicable purposes.

TECHNICAL FIELD

Aspects of the present disclosure relate to wireless communications, and more particularly, to techniques for mitigating interference caused by legacy reference signals from neighbor cells (e.g., LTE cell-specific reference signals) to non-legacy downlink transmissions in a serving cell (e.g., NR/5G PDSCH transmissions).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, further improvements, e.g., improvements in latency, reliability, and the like, in NR and LTE technology remain useful. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communications by a user equipment (UE). The method generally includes receiving signaling configuring the UE with channel state information (CSI) reference signals (RS) resources comprising at least one of zero power (ZP) or non-zero power (NZP) CSI-RS resources that align with resources of a cell specific reference (CRS) pattern of a first RAT and performing rate matching for one or more physical downlink shared channel (PDSCH) transmissions based on the CSI-RS resources.

One innovative aspect of the subject matter described in this disclosure can be implemented in a method for wireless communications by a network entity of a first radio access technology (RAT). The method generally includes determining a cell specific reference (CRS) pattern for at least one neighbor cell of a second RAT, configuring a user equipment (UE) with channel state information (CSI) reference signals (RS) resources comprising at least one of zero power (ZP) or non-zero power (NZP) CSI-RS resources that align with resources of the CRS pattern, and performing rate matching for one or more physical downlink shared channel (PDSCH) transmissions to the UE based on the CSI-RS resources.

One innovative aspect of the subject matter described in this disclosure can be implemented in a method for wireless communications by a user equipment (UE). The method generally includes receiving, from a network entity of a first radio access technology (RAT), signaling configuring the UE with multiple cell specific reference (CRS) rate matching patterns for a second RAT, receiving, from the network entity, signaling to trigger at least one of the multiple CRS rate matching patterns, and performing rate matching for one or more physical downlink shared channel (PDSCH) transmissions based on the triggered at least one CRS rate matching pattern.

One innovative aspect of the subject matter described in this disclosure can be implemented in a method for wireless communications by a network entity of a first radio access technology (RAT). The method generally includes configuring a user equipment (UE) with multiple cell specific reference (CRS) rate matching patterns for a second RAT, determining a change in environment, sending the UE signaling to trigger at least one of the multiple CRS rate matching patterns based on the determination, and performing rate matching for one or more physical downlink shared channel (PDSCH) transmissions to the UE based on the triggered at least one CRS rate matching pattern.

One innovative aspect of the subject matter described in this disclosure can be implemented in an apparatus for wireless communications by a user equipment (UE). The apparatus generally includes at least one processor, and a memory coupled to the at least one processor, the memory comprising code executable by the at least one processor to cause the apparatus to receive signaling configuring the UE with channel state information (CSI) reference signals (RS) resources comprising at least one of zero power (ZP) or non-zero power (NZP) CSI-RS resources that align with resources of a cell specific reference (CRS) pattern of a first RAT and perform rate matching for one or more physical downlink shared channel (PDSCH) transmissions based on the CSI-RS resources.

One innovative aspect of the subject matter described in this disclosure can be implemented in an apparatus for wireless communications by a network entity of a first radio access technology (RAT). The apparatus generally includes at least one processor, and a memory coupled to the at least one processor, the memory comprising code executable by the at least one processor to cause the apparatus to determine a cell specific reference (CRS) pattern for at least one neighbor cell of a second RAT, configure a user equipment (UE) with channel state information (CSI) reference signals (RS) resources comprising at least one of zero power (ZP) or non-zero power (NZP) CSI-RS resources that align with resources of the CRS pattern, and perform rate matching for one or more physical downlink shared channel (PDSCH) transmissions to the UE based on the CSI-RS resources.

One innovative aspect of the subject matter described in this disclosure can be implemented in an apparatus for wireless communications by a user equipment (UE). The apparatus generally includes at least one processor, and a memory coupled to the at least one processor, the memory comprising code executable by the at least one processor to cause the apparatus to receive, from a network entity of a first radio access technology (RAT), signaling configuring the UE with multiple cell specific reference (CRS) rate matching patterns for a second RAT, receive, from the network entity, signaling to trigger at least one of the multiple CRS rate matching patterns, and perform rate matching for one or more physical downlink shared channel (PDSCH) transmissions based on the triggered at least one CRS rate matching pattern.

One innovative aspect of the subject matter described in this disclosure can be implemented in an apparatus for wireless communications by a network entity of a first radio access technology (RAT). The apparatus generally includes at least one processor, and a memory coupled to the at least one processor, the memory comprising code executable by the at least one processor to cause the apparatus to configure a user equipment (UE) with multiple cell specific reference (CRS) rate matching patterns for a second RAT, determine a change in environment, send the UE signaling to trigger at least one of the multiple CRS rate matching patterns based on the determination, and perform rate matching for one or more physical downlink shared channel (PDSCH) transmissions to the UE based on the triggered at least one CRS rate matching pattern.

One innovative aspect of the subject matter described in this disclosure can be implemented in an apparatus for wireless communications by a user equipment (UE). The apparatus generally includes means for receiving signaling configuring the UE with channel state information (CSI) reference signals (RS) resources comprising at least one of zero power (ZP) or non-zero power (NZP) CSI-RS resources that align with resources of a cell specific reference (CRS) pattern of a first RAT and means for performing rate matching for one or more physical downlink shared channel (PDSCH) transmissions based on the CSI-RS resources.

One innovative aspect of the subject matter described in this disclosure can be implemented in an apparatus for wireless communications by a network entity of a first radio access technology (RAT). The apparatus generally includes means for determining a cell specific reference (CRS) pattern for at least one neighbor cell of a second RAT, means for configuring a user equipment (UE) with channel state information (CSI) reference signals (RS) resources comprising at least one of zero power (ZP) or non-zero power (NZP) CSI-RS resources that align with resources of the CRS pattern, and means for performing rate matching for one or more physical downlink shared channel (PDSCH) transmissions to the UE based on the CSI-RS resources.

One innovative aspect of the subject matter described in this disclosure can be implemented in an apparatus for wireless communications by a user equipment (UE). The apparatus generally includes means for includes receiving, from a network entity of a first radio access technology (RAT), signaling configuring the UE with multiple cell specific reference (CRS) rate matching patterns for a second RAT, means for receiving, from the network entity, signaling to trigger at least one of the multiple CRS rate matching patterns, and means for performing rate matching for one or more physical downlink shared channel (PDSCH) transmissions based on the triggered at least one CRS rate matching pattern.

One innovative aspect of the subject matter described in this disclosure can be implemented in an apparatus for wireless communications by a network entity of a first radio access technology (RAT). The apparatus generally includes means for configuring a user equipment (UE) with multiple cell specific reference (CRS) rate matching patterns for a second RAT, means for determining a change in environment, means for sending the UE signaling to trigger at least one of the multiple CRS rate matching patterns based on the determination, and means for performing rate matching for one or more physical downlink shared channel (PDSCH) transmissions to the UE based on the triggered at least one CRS rate matching pattern.

One innovative aspect of the subject matter described in this disclosure can be implemented in in a computer readable medium storing computer executable code thereon for wireless communication by a UE. The computer readable medium generally includes code for receiving signaling configuring the UE with channel state information (CSI) reference signals (RS) resources comprising at least one of zero power (ZP) or non-zero power (NZP) CSI-RS resources that align with resources of a cell specific reference (CRS) pattern of a first RAT and code for performing rate matching for one or more physical downlink shared channel (PDSCH) transmissions based on the CSI-RS resources.

One innovative aspect of the subject matter described in this disclosure can be implemented in in a computer readable medium storing computer executable code thereon for wireless communication by a wireless entity. The computer readable medium generally includes code for determining a cell specific reference (CRS) pattern for at least one neighbor cell of a second RAT, code for configuring a user equipment (UE) with channel state information (CSI) reference signals (RS) resources comprising at least one of zero power (ZP) or non-zero power (NZP) CSI-RS resources that align with resources of the CRS pattern, and code for performing rate matching for one or more physical downlink shared channel (PDSCH) transmissions to the UE based on the CSI-RS resources.

One innovative aspect of the subject matter described in this disclosure can be implemented in in a computer readable medium storing computer executable code thereon for wireless communication by a UE. The computer readable medium generally includes code for includes receiving, from a network entity of a first radio access technology (RAT), signaling configuring the UE with multiple cell specific reference (CRS) rate matching patterns for a second RAT, code for receiving, from the network entity, signaling to trigger at least one of the multiple CRS rate matching patterns, and code for performing rate matching for one or more physical downlink shared channel (PDSCH) transmissions based on the triggered at least one CRS rate matching pattern.

One innovative aspect of the subject matter described in this disclosure can be implemented in in a computer readable medium storing computer executable code thereon for wireless communication by a wireless entity. The computer readable medium generally includes code for configuring a user equipment (UE) with multiple cell specific reference (CRS) rate matching patterns for a second RAT, code for determining a change in environment, code for sending the UE signaling to trigger at least one of the multiple CRS rate matching patterns based on the determination, and code for performing rate matching for one or more physical downlink shared channel (PDSCH) transmissions to the UE based on the triggered at least one CRS rate matching pattern.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIGS. 5A and 5B illustrate example parameters for channel state information (CSI) reference signal (RS) resource configurations.

FIG. 13 illustrates example CSI interference measurement (CSI-IM) patterns, in accordance with some aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
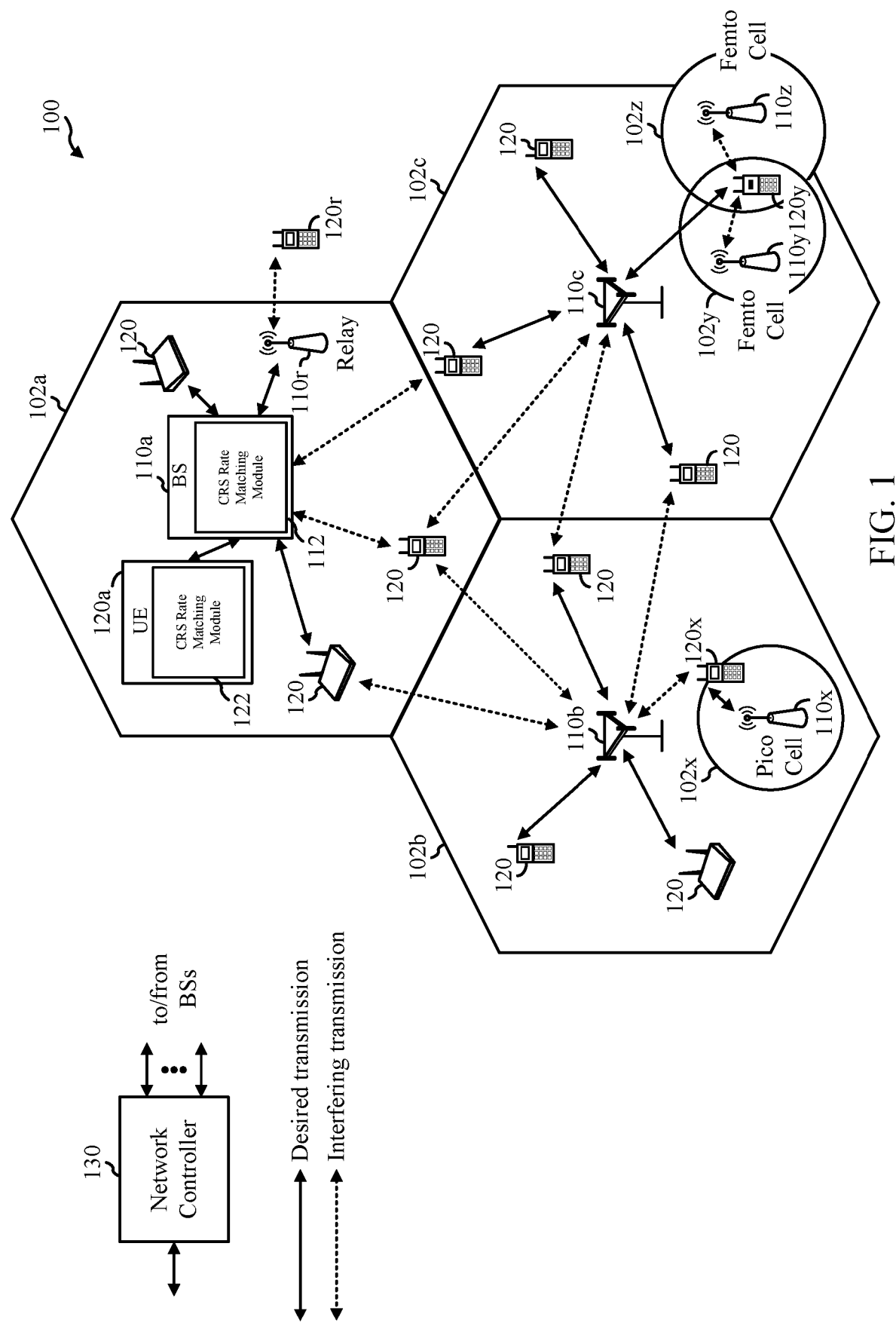
FIG. 1 shows an example wireless communication network in which some aspects of the present disclosure may be performed.

Aspects of the present disclosure relate to wireless communications, and more particularly, to techniques for mitigating interference caused by legacy reference signals from neighbor cells (e.g., LTE cell-specific reference signals) to non-legacy downlink transmissions in a serving cell (e.g., NR/5G PDSCH transmissions).

The techniques may be used, for example, in systems/networks that utilize Dynamic Spectrum Sharing (DSS). DSS generally refers to a technology that allows the deployment of multiple radio access technologies (RATs) (e.g., simultaneously deployed 4G LTE and 5G NR), in the same frequency band. DSS dynamically allocates spectrum resources between the two technologies based on user demand.

In some cases, the techniques presented herein may help mitigate interference coming from non-colliding cell-specific references (CRS) of neighboring cells. These techniques may improve conventional mitigation techniques, which typically only provide mitigation for CRS from serving LTE cells.

In some cases, strong interference from neighbor LTEs with cell non-colliding CRS may be mitigated by rate matching. In such cases, significant (e.g., 20% or more) throughput gains may be observed in overlapping cell coverage conditions.

By configuring a UE with non-zero power (NZP) and/or zero power (ZP) CSI-RS resources, these corresponding resource elements (REs) may be used to perform physical downlink shared channel (PDSCH) rate matching around REs that collide with the CRS of an interfering neighboring LTE cell. The interfering CRS are effectively "blanked-out" so that these REs are not used for 5G/NR PDSCH.

In some cases, a network entity may detect an interfering entity (e.g., a dominant interfering neighbor) and corresponding LTE CRS patterns to trigger rate matching. In some cases, detection of one or more dominant interfering entities be used to trigger one or more rate matching patterns, allowing for semi-static or dynamic PDSCH rate matching, based on the detected interference. Techniques are also provided that may help support such CRS interference detection.

The following description provides examples of allowing for the coexistence of legacy reference signals and non-legacy synchronization signals in a wireless communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, as shown in FIG. 1, UE 120$a$ may include a CRS rate matching module 122 that may be configured to perform (or cause UE 120$a$ to perform) operations 700 of FIG. 7. Similarly, a base station 110$a$ may include a CRS rate matching module 112 that may be configured to perform (or cause the base station 110$a$ to perform) operations 600 of FIG. 6.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110$a$-$z$ (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BSs for the femto cells 102$y$ and 102$z$, respectively. A BS may support one or multiple cells. The BSs 110 communicate with user equipment (UEs) 120$a$-$y$ (each also individually referred to herein as UE 120 or collectively as UEs 120) in the wireless communication network 100. The UEs 120 (for example, 120$x$, 120$y$, etc.) may be dispersed throughout the wireless communication network 100, and each UE 120 may be stationary or mobile.

Wireless communication network 100 may also include relay stations (for example, relay station 110$r$), also referred to as relays or the like, that receive a transmission of data or other information from an upstream station (for example, a BS 110$a$ or a UE 120$r$) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
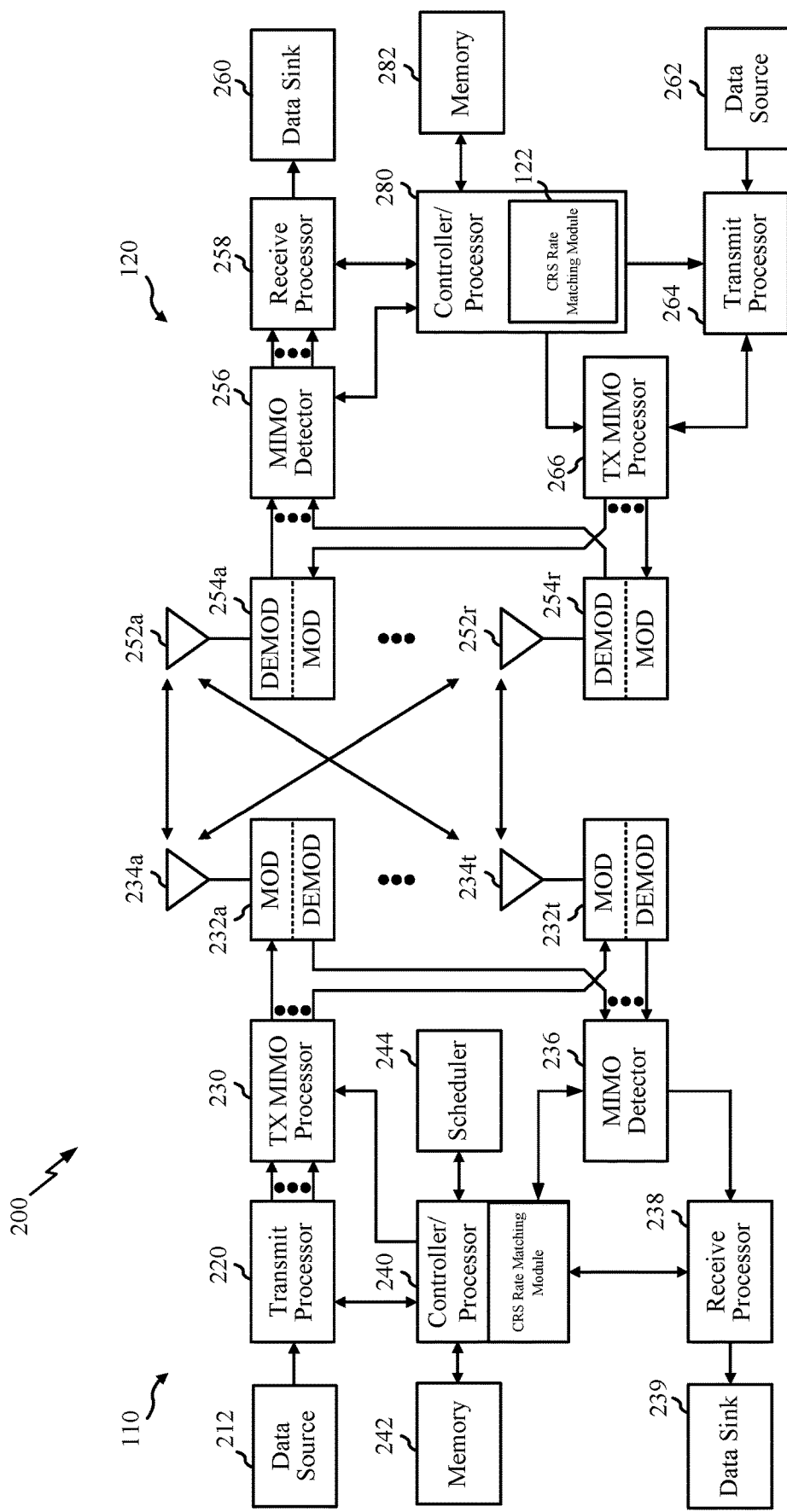
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232$a$-232$t$. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232$a$-232$t$ may be transmitted via the antennas 234$a$-234$t$, respectively.

At the UE 120, the antennas 252$a$-252$r$ may receive the downlink signals from the BS 110 and may provide received signals to the demodulators (DEMODs) in transceivers 254$a$-254$r$, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254$a$-254$r$, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254$a$-254$r$ (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink. In one example, memory 282 or memory 242 can be a non-transitory computer-readable medium comprising instructions (e.g., instructions that instruct a processor, e.g., controller/processor 680, controller/processor 640, or other processor) to perform any aspects of FIGS. 4A-C and/or 5A-B. Additionally or alternatively, such instructions may be copied or installed onto memory 282 or memory 242 from a non-transitory computer-readable medium.

The controller/processor 280 or other processors and modules at the UE 120 may perform or direct the execution of processes for the techniques described herein. As shown in FIG. 2, the controller/processor 280 of the UE 120 has a CRS rate matching module 122 that may be configured to perform operations 700 of FIG. 7, as discussed in further detail below. The controller/processor 240 of the base station 110 includes a CRS rate matching module that may be configured to perform operations 600 of FIG. 6, as discussed in further detail below. Although shown at the Controller/Processor, other components of the UE or BS may be used to perform the operations described herein.

Figure 3:
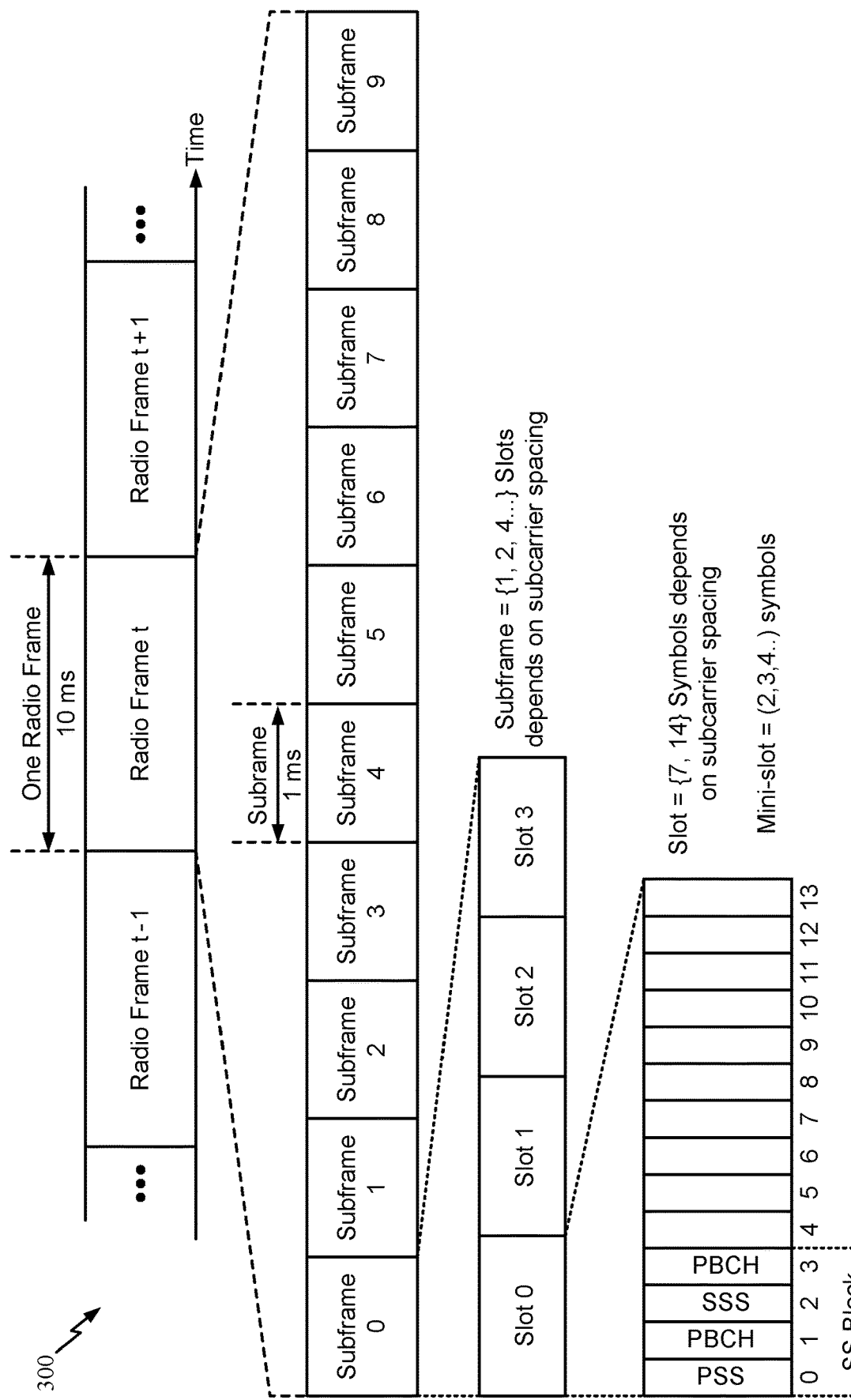
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a three symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Interference Mitigation of Strong LTE Neighbor Cell Non-Colliding CRS in Dynamic Spectrum Sharing (DSS) Configurations Aspects of the present disclosure relate to wireless communications, and more particularly, to techniques for mitigating interference caused by legacy reference signals from neighbor cells (e.g., LTE cell-specific reference signals) to non-legacy downlink transmissions in a serving cell (e.g., NR/5G PDSCH transmissions).

The techniques may be used, for example, in systems/networks that utilize Dynamic Spectrum Sharing (DSS). DSS generally refers to a technology that allows the deployment of multiple radio access technologies (RATs) (e.g., simultaneously deployed 4G LTE and 5G NR), in the same frequency band. DSS dynamically allocates spectrum resources between the two technologies based on user demand.

Aspects of the present disclosure provide techniques that may help mitigate interference from neighboring LTE cells. In some cases, these techniques may help mitigate interference coming from non-colliding cell-specific references (CRS) of neighboring cells. These techniques may improve conventional mitigation techniques, which typically only provide mitigation for CRS from serving LTE cells.

In some cases, strong interference from neighbor LTEs with cell non-colliding CRS may be mitigated by rate matching. In such cases, significant (e.g., 20% or more) throughput gains may be observed in overlapping cell coverage conditions.

As described below, by configuring a UE with non-zero power (NZP) and/or zero power (ZP) CSI-RS resources, these corresponding resource elements (REs) may be used to perform physical downlink shared channel (PDSCH) rate matching around REs that collide with the CRS of an interfering neighboring LTE cell. The interfering CRS are effectively "blanked-out" so that these REs are not used for 5G/NR PDSCH.

Figures 4A, 4B, 4C:
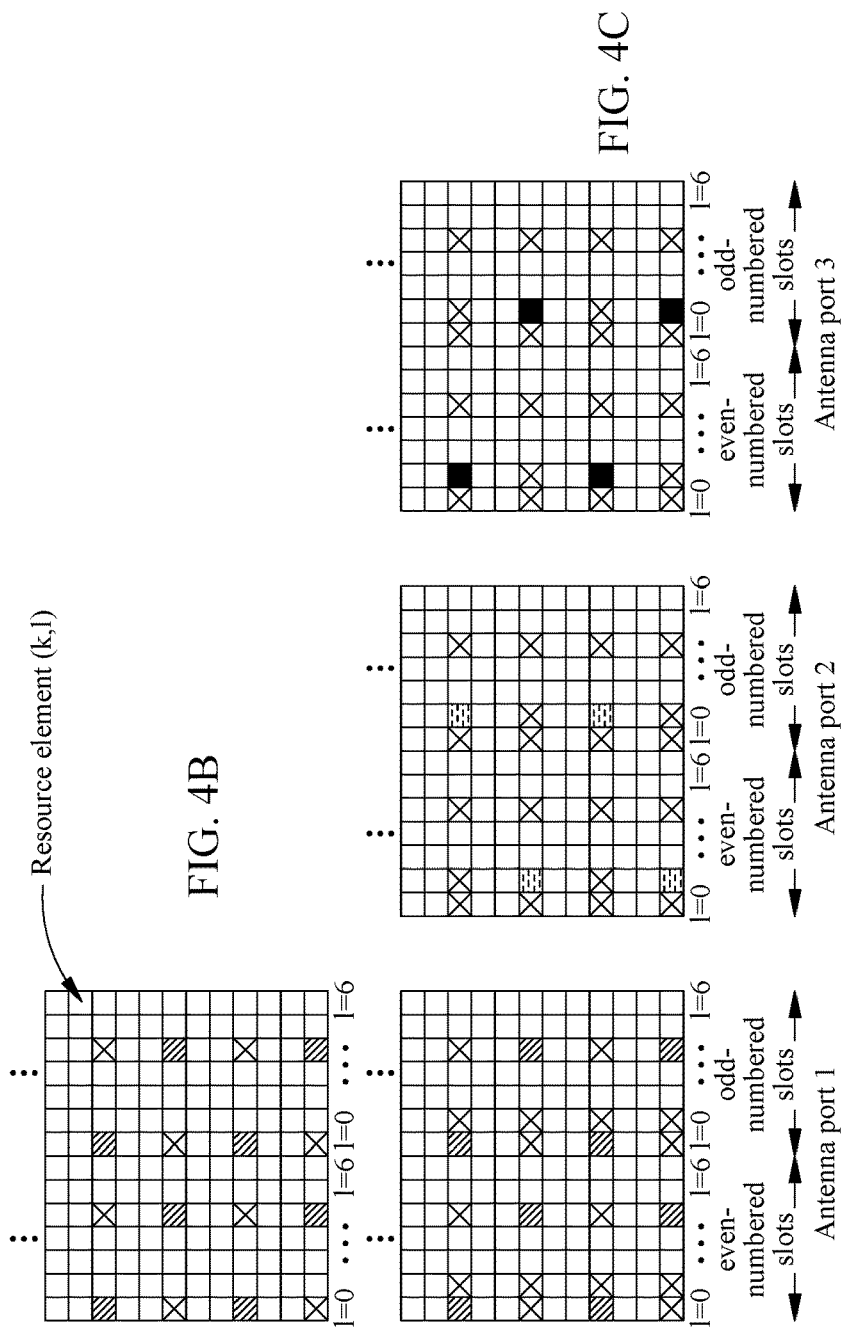
FIGS. 4A-4C illustrate example cell-specific reference signal (CRS) patterns that may be addressed, in accordance with certain aspects of the present disclosure.

The CSI-RS resources may be configured to align with REs of a neighboring cell LTE CRS pattern. FIGS. 4A, 4B, and 4C illustrate examples of LTE CRS patterns and RE mappings for one antenna port, two antenna ports, and four antenna ports, respectively. A UE may be configured, via radio resource control (RRC) signaling, with various CSI-RS resource configurations, subject to certain constraints. For example, FIGS. 5A and 5B illustrate example ZP and NZP CSI-RS resource multiplicity and type constraint definitions (e.g., on a total number of resources and resources per set).

Figure 6:
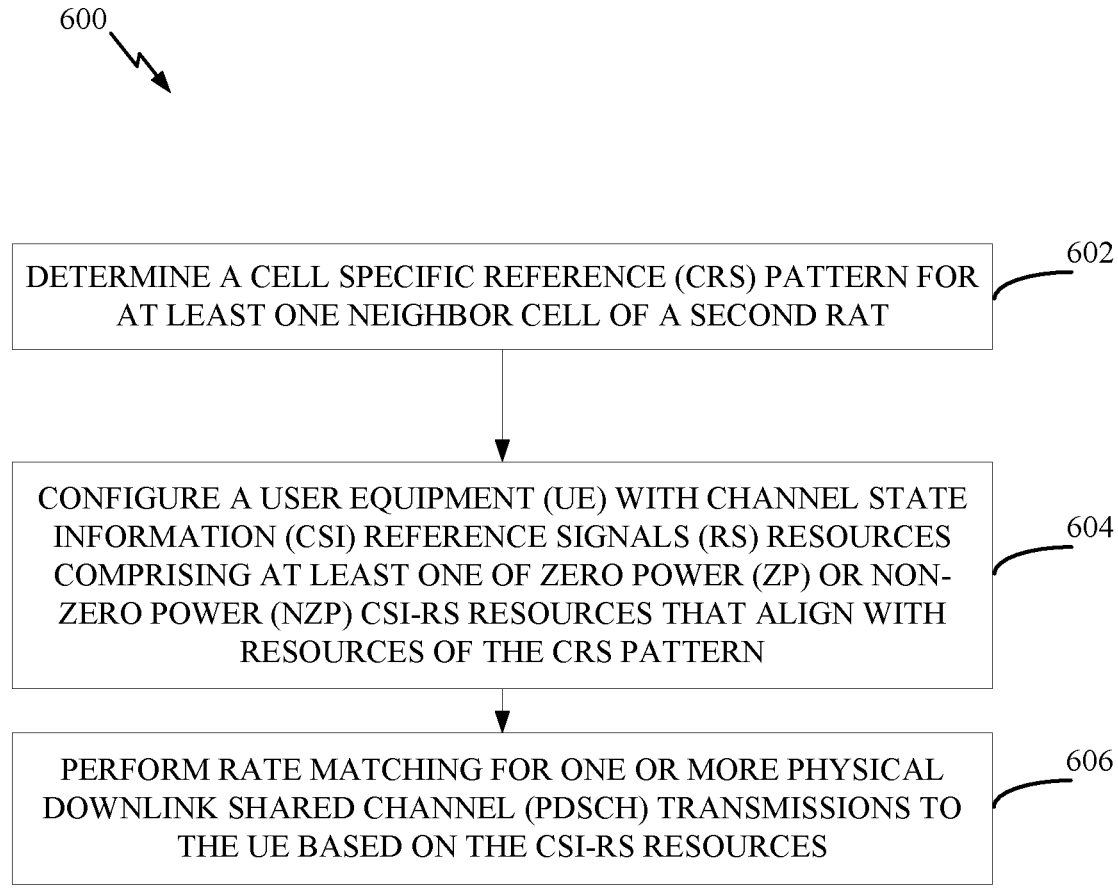
FIG. 6 illustrates example operations for wireless communications by a network entity, in accordance with some aspects of the present disclosure.

In some cases, a UE may be configured with a list of ZP/NZP CSI-RS to apply PDSCH rate matching for one or more interfering LTE CRS patterns (typically for a serving LTE cell), as illustrated in FIG. 6. Aspects of the present disclosure provide techniques that may provide additional flexibility using CSI-RS resources for LTE CRS rate matching.

FIG. 6 illustrates example operations that may be performed by a network entity to configure a UE for rate matching around CRS, in accordance with aspects of the present disclosure. For example, operations 600 may be performed by a gNB in a DSS scenario.

Operations 600 begin, at 602, by determining a cell specific reference (CRS) pattern for at least one neighbor cell of a second RAT. For example, the network entity may detect a dominant interfering entity (or interfering entities) and their corresponding LTE CRS patterns.

At 604, the network entity configuring the user equipment (UE) with channel state information (CSI) reference signals (RS) resources comprising at least one of zero power (ZP) or non-zero power (NZP) CSI-RS resources that align with resources of the CRS pattern. At 606, the network entity performs rate matching for one or more physical downlink shared channel (PDSCH) transmissions to the UE based on the CSI-RS resources.

Figure 7:
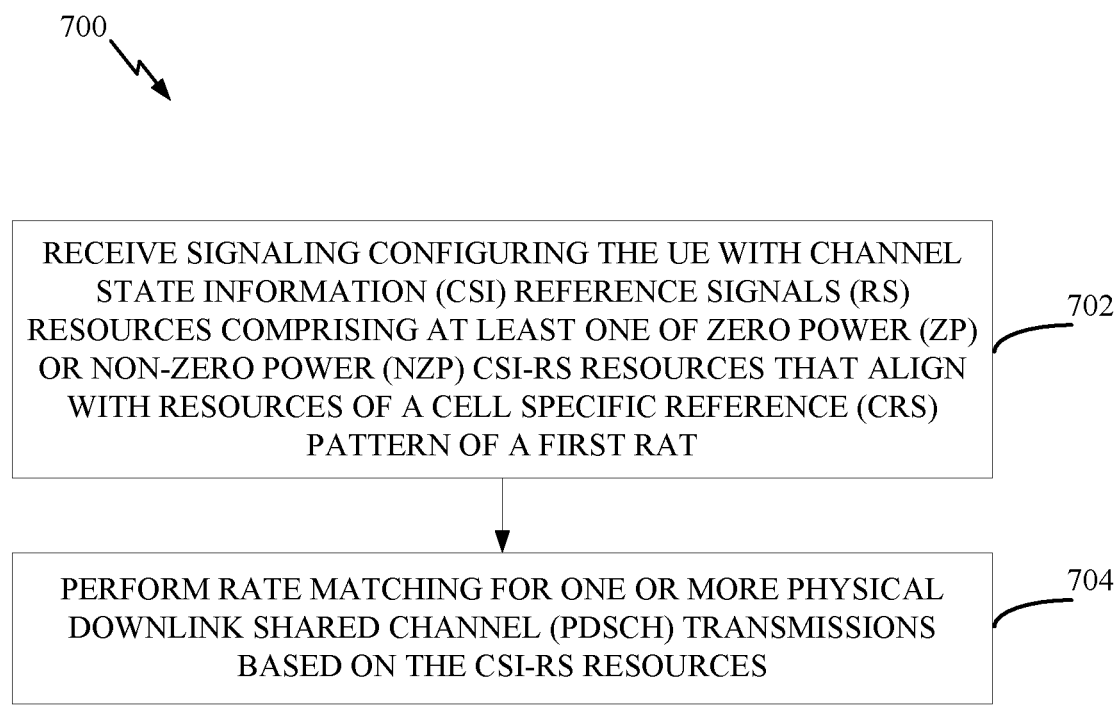
FIG. 7 illustrates example operations for wireless communications by a user equipment (UE), in accordance with some aspects of the present disclosure.

FIG. 7 illustrates example operations 700 that may be performed by a UE to perform CRS rate matching, in accordance with aspects of the present disclosure. For example, operations 700 may be performed by a UE configured by a network entity according to operations 600 of FIG. 6.

Operations 700 begin, at 702, by receiving signaling configuring the UE with channel state information (CSI) reference signals (RS) resources comprising at least one of zero power (ZP) or non-zero power (NZP) CSI-RS resources that align with resources of a cell specific reference (CRS) pattern of a first RAT. At 704, the UE performs rate matching for one or more physical downlink shared channel (PDSCH) transmissions based on the CSI-RS resources.

Aspects of the present disclosure present various options for rate matching around neighbor cell CRS. One option provides for RE-level rate matching with NZP resources and may be achieved within current standards constraints.

Figure 8:
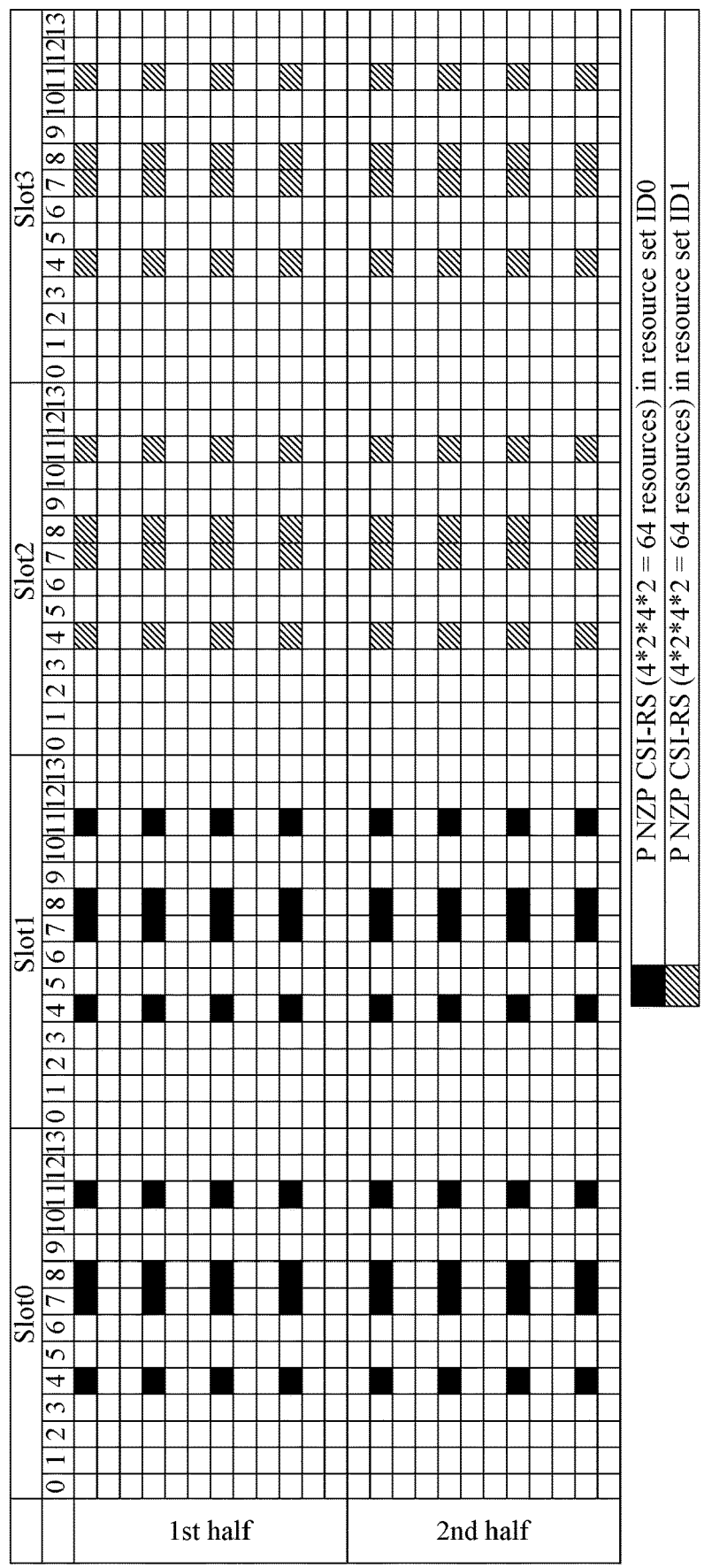
FIGS. 8, 9, 10, 11, 12A, and 12B illustrate example configurations of CSI-RS resources to mitigate interference by a neighbor cell CRS pattern, in accordance with some aspects of the present disclosure.

FIG. 8 illustrates an example of such a scenario, relying on NZP CSI-RS resources. This approach may be desirable, as it may be possible to configure a large number of such resources that allow the effective blanking out of the specific REs that may come from the interfering LTE cell.

The illustrated RE-level rate matching using NZP CSI-RS may be aligned with neighbor cell LTE-CRS, for example, if there is one dominant neighbor LTE cell. In the example illustrated in FIG. 8, a total of 128 single port NZP-CSI-RS may be configured (with four-slot periodicity), as periodic or semi-persistent resources.

The example illustrated in FIG. 8 shows two sets of 64 resources. Each set of 64 resources is configured in a resource set. Each set may have resources with different time and frequency allocations (e.g., with each set having resources with a different slot offset from the other set). Each set may have two groups of resources with different slot offset. Each group may have two parts, with each part overlapping CRS resources of half of the frequency range. In some cases, each part may have 16 single-port NZP resources, each having different symbol and RE allocation to match the neighbor cell LTE CRS pattern. As illustrated, the frequency resources may be partitioned into first and second halves.

In some cases, a network may change the number of CRS ports from four ports to either two ports or one port. In response, the configuration of resources may change. For example, where the number of CRS ports is reduced from four ports to two ports, the adapted CRS configuration may require 96 resourced (e.g., two sets of 48 resources).

Figure 9:
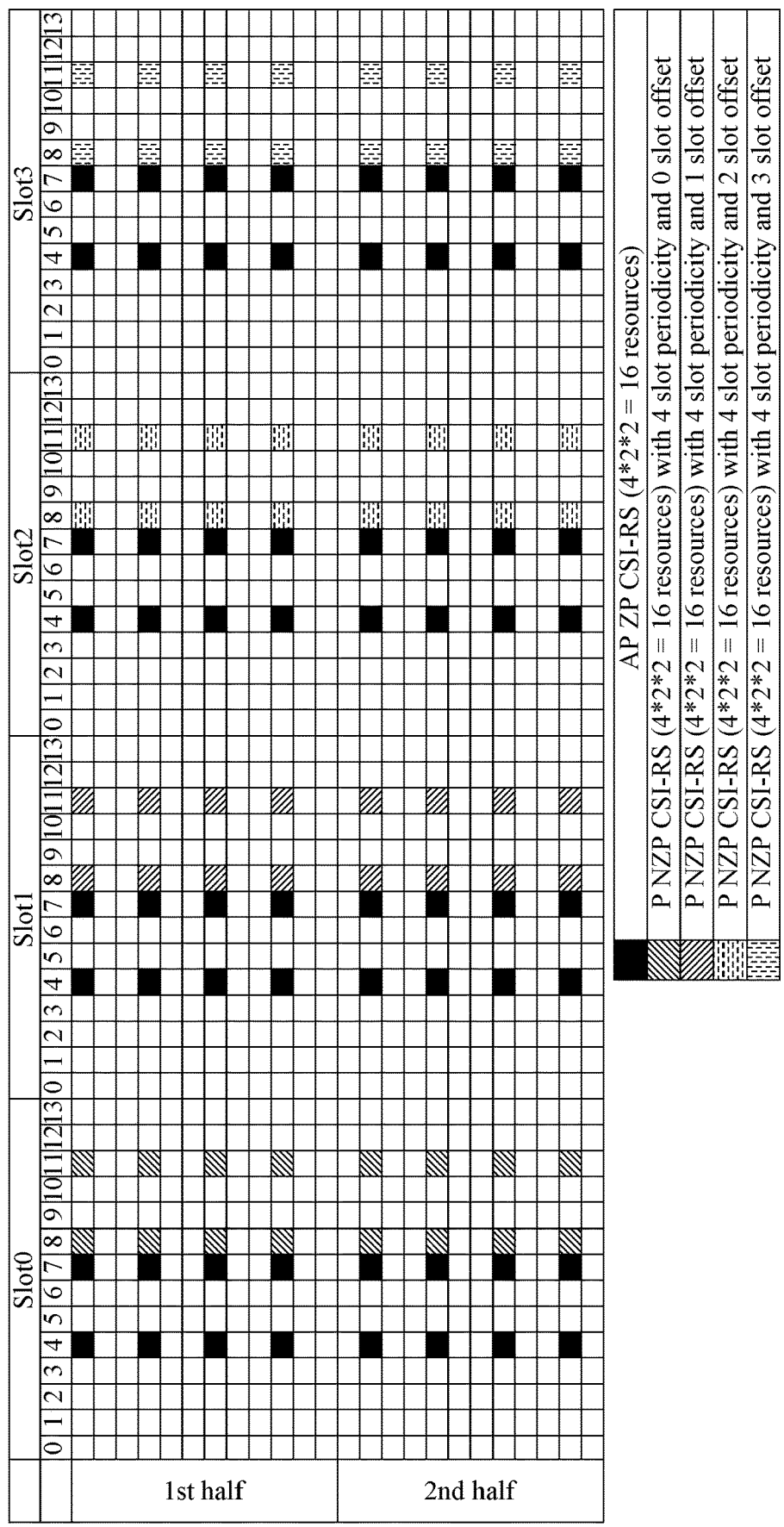

As illustrated in FIG. 9, according to a second option, RE-level rate matching may be achieved with both ZP and NZP resources. In this case, RE-level rate matching may be achieved using ZP and NZP CSI-RS aligned with neighbor cell LTE-CRS (e.g., if there is one dominant neighbor LTE cell). The illustrated example shows 16, single-port aperiodic ZP CSI-RS for two LTE-CRS symbols with two parts. Each part has overlapping CRS resources of half of the frequency range. Each part may have 8 single-port ZP resources, each having different symbol and RE allocation to match the neighbor cell LTE CRS pattern. In some cases, the network may trigger the ZP CSI-RS resources at every slot where LTE CRS interference is expected.

The configuration may also have 64 single port NZP CSI-RS (with four-slot periodicity) configured as periodic or semi-persistent resources for the two remaining LTE-CRS symbols, which may be configured in a single resource set or multiple resource sets. A set may have four groups of resources with different slot offset. Each group may have two parts, with each part overlapping CRS resources of half of the frequency range. Each part may have 8 single-port NZP resources each having different symbol and RE allocation to match the neighbor cell LTE CRS pattern.

In certain cases, a network may change the number of CRS ports from four to two ports or one port. As a result, the configuration may be simplified. For example, for two port configurations, the configuration may be simplified as 16 single-port aperiodic ZP CSI-RS for the first two LTE-CRS symbols and 32 single port NZP CSI-RS (with four-slot periodicity) configured as periodic or semi-persistent resources for the last LTE-CRS symbols.

Figure 10:
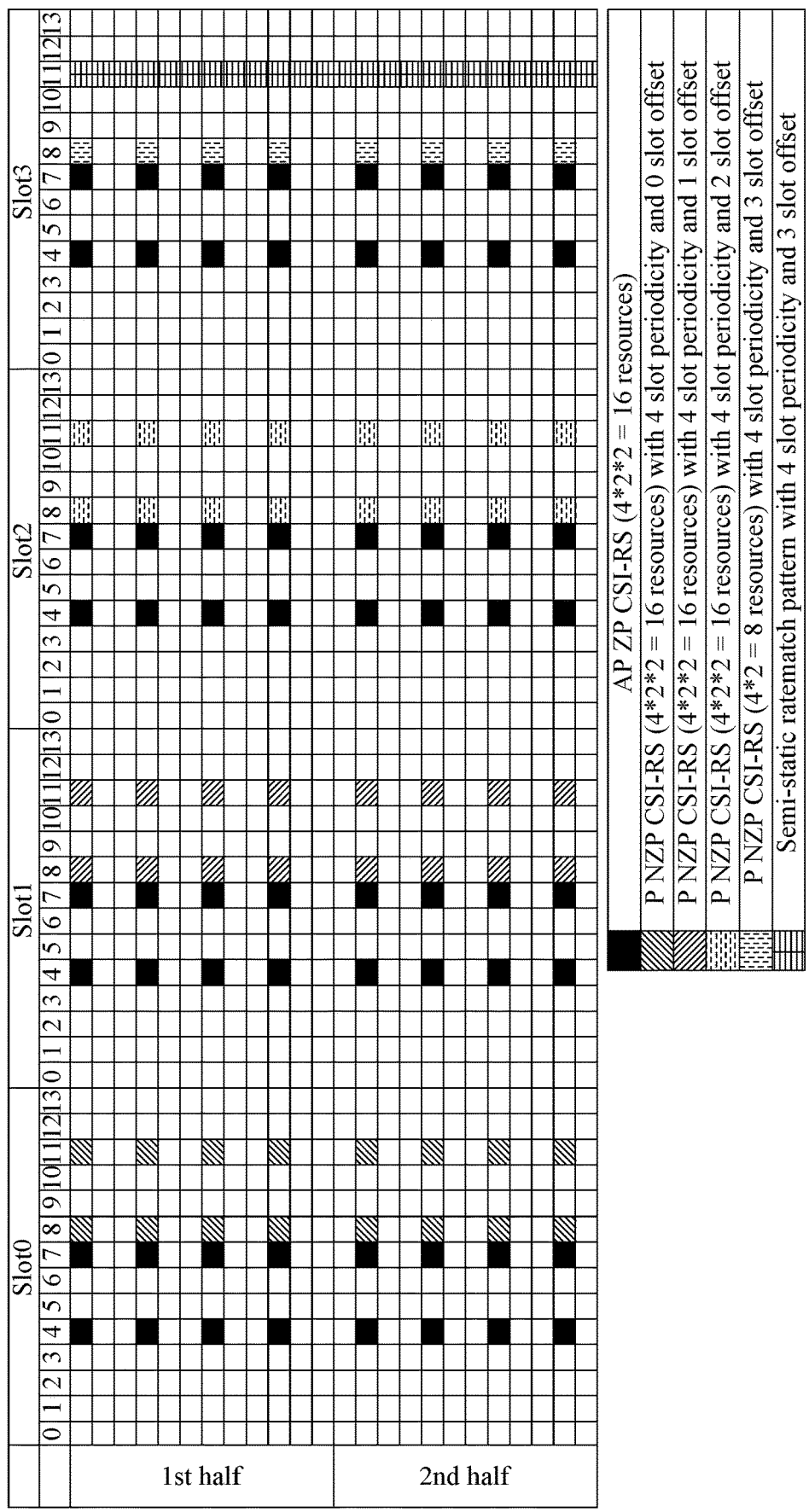

FIG. 10 illustrates an option for RE-level rate matching similar to that illustrated in FIG. 9. In addition to rate matching achieved with both ZP and NZP resources, this RE-level configuration may add resource block level (RB-level) rate matching, with the network configuring one or more RBs for rate matching around one or more symbols containing LTE CRS.

As illustrated, the configuration may have 16 single-port aperiodic ZP CSI-RS for 2 LTE-CRS symbols. The configuration may have two parts, with each part overlapping CRS resources of half of the frequency range. Each part may have 8 single-port ZP resources having different symbol and RE allocations to match the neighbor cell LTE CRS pattern.

The configuration may also have 56 single-port NZP CSI-RS (with four-slot periodicity) configured as periodic or semi-persistent resources (e.g., relative to the example of FIG. 8, the NZP CSI-RS is reduced by 8 from 64 due to a configured resource block (RB)). This may help cover two remaining LTE-CRS symbols in slots 0, 1, and 2 and one remaining LTE-CRS symbols in the slot 3. NZP resources may be configured in a single or multiple resource sets. Each set may have four groups of resources with different slot offsets. Each group may have two parts, with each part overlapping CRS resources of half of the frequency range. Each part may have 8 single-port NZP resources having different symbol and RE allocations to match the neighbor cell LTE CRS pattern except for slot 3 parts which have four resources.

As illustrated, RB level-rate matching may be used for one or more symbols. In the illustrated example, an RB is configured for the last LTE-CRS symbol in slot 3.

Other combinations of ZP, NZP and RB level rate matching resources may be configured than the example shown in FIG. 10. For example, where a network changes a number of CRS ports from four to two, the configuration may be simplified as 16 AP ZP CSI-RS for the first two LTE-CRS symbols and 32 P NZP CSI-RS (with four-slot periodicity) for the last LTE-CRS symbols.

Figure 11:
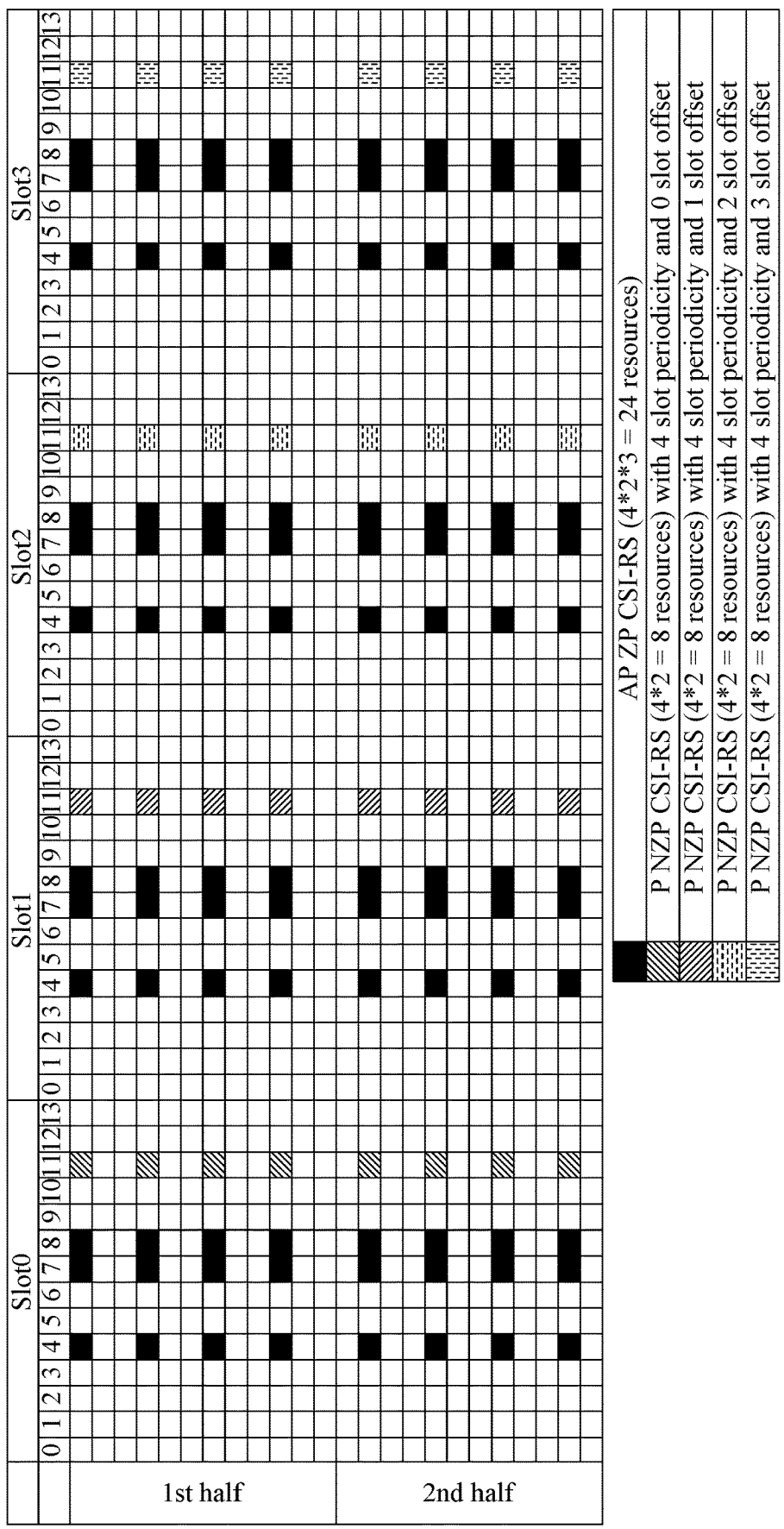

If current ZP/NZP CSI-RS resource constraints listed in the standards are relaxed, various other options may be used for CRS rate matching. FIG. 11 illustrates an example option.

The configuration shown in FIG. 11 has 24 single-port aperiodic ZP CSI-RS for two LTE-CRS symbols. Current standards allow configuration of up to 32 ZP CSI-RS resources; however, the two aperiodic sets cannot be triggered in tandem. Thus, the proposal for the configuration shown in FIG. 11 allows a triggering mechanism to trigger two sets at the same time, with each set having up to 16 resources.

Further, the configuration also has 32 single port periodic NZP CSI-RS (with four-slot periodicity) for the last LTE-CRS symbols, which can be configured in a single or in multiple resource sets, with four groups of resources with different slot offset. Each group may have two parts, with each part overlapping CRS resources of half of the frequency range. Each part may have four single port NZP resources each having different symbol and RE allocation to match the neighbor cell LTE CRS pattern.

Other combinations of ZP, and NZP resources may be configured with up to 32 ports for ZP in two sets. One example configuration that may involve the triggering mechanism proposed herein contains two resource sets for AP ZP CSI-RS:

Set 1 (ID1): 16 AP ZP CSI-RS (to cover first two LTE-CRS symbols); and

Set 2 (ID2): 8 AP ZP CSI-RS (to cover the third LTE-CRS symbol).

Current triggering mechanisms allow for aperiodic triggering of one out of three possible ZP sets. The present disclosure proposes a mechanism whereby multiple sets (e.g., Set 1 and Set 2) can be triggered in tandem in the same slot, for example, by using a trigger assigned for a third set that is not actually configured. For example, two bits may be used to trigger one or both sets as:

01 for Set 1 (ID1);
10 for Set 2 (ID2); or
11 for both Set 1 and Set 2.

This option to trigger both sets may not be supported under current standards.

Figures 12A, 12B:
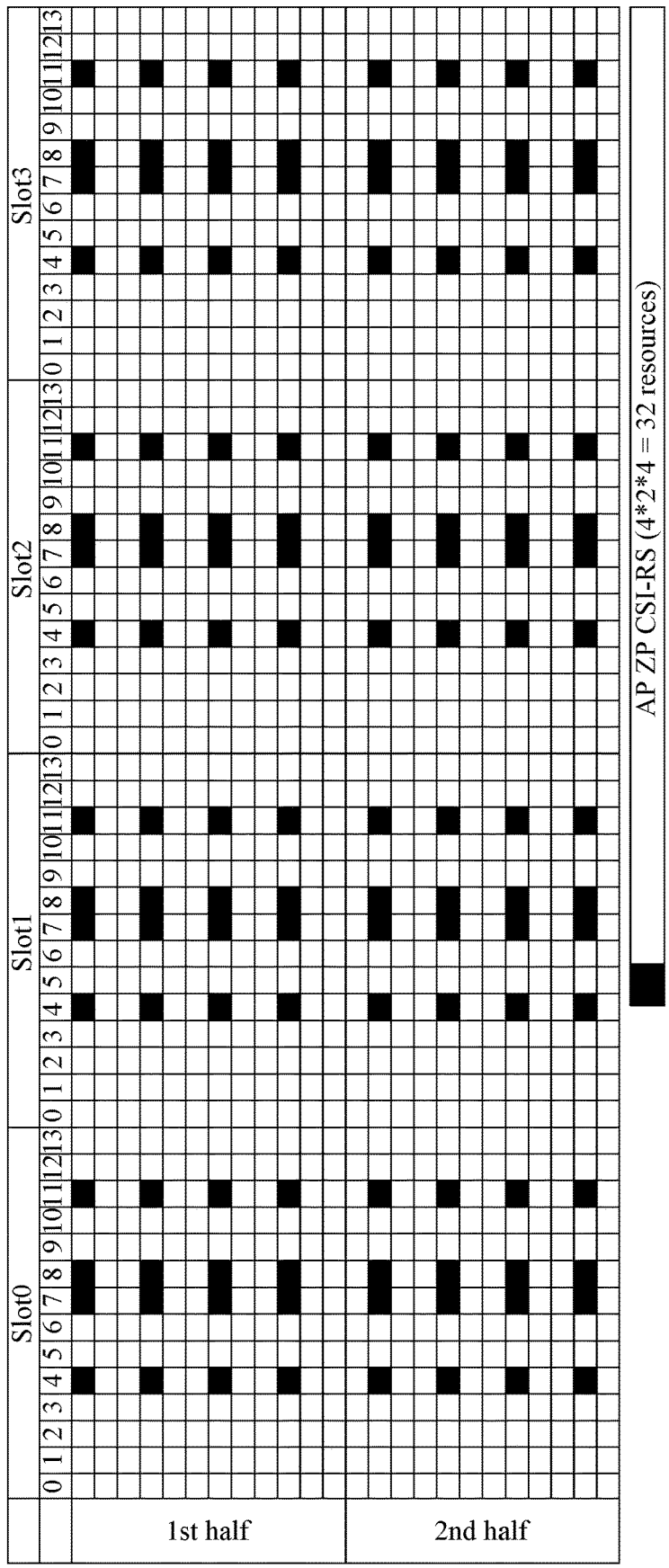

FIGS. 12A-12B illustrate another example configuration for RE-level rate matching with ZP CSI-RS resources that may not be supported under current standards. The illustrated configuration in FIG. 12A has 32 single-port aperiodic ZP CSI-RS for four LTE-CRS symbols. To support this, a maximum number of ZP CSI-RS resources (i.e., 'maxNrofZP-CSI-RS-Resources') may need to be increased from 32 to 64, as shown in FIG. 12B. Similarly, the maximum number of ZP CSI-RS resources per set (i.e., 'maxNrofZP-CSI-RS-ResourcesPerSef') may need to increase from 16 to 32, as shown in FIG. 12B.

Another option that may be used in addition, or as an alternative, to the triggering mechanisms described above, is to have a UE configured with multiple rate matching patterns for LTE-CRS with triggering of different patterns. For example, multiple RateMatchingPatternLTE-CRS may be defined with periodic/semi-persistent/aperiodic triggering. Similar to ZP-CSI-RS, multiple RateMatchingPatternLTE-CRS can be configured to match different serving/neighbor cell CRS configurations, and associated with a time domain behavior (periodic/semi-persistent/aperiodic triggering). This use of triggering multiple rate matching patterns may allow for dynamic rate matching depending on detection of the environment (e.g., detection of one or more dominant interferers).

In one example, periodic triggering can be used to rate match serving cell LTE CRS tones (single option for periodicity=1 slot). Semi-persistent triggering configured by RRC may be activated/deactivated by MAC-CE to mitigate interference from neighboring non-colliding LTE Cell CRS. Once activated, rate matching may be applied at every PDSCH grant, until deactivation. Aperiodic triggering, configured by RRC and trigger by a downlink grant DCI, may be used to mitigate interference from neighboring non-colliding LTE Cell CRS.

According to certain aspects of the present disclosure, multiple rate matching patterns may involve multiple CCs. For example, the network may configure a secondary component carrier (SCC) with the same NR Absolute Radio Frequency Channel Number (NR-ARFCN) as a primary component carrier (PCC). A RateMatchPatternLTE-CRS of the SCC may be configured by a serving gNB to align with the CRS of the neighboring non-colliding interfering LTE CRS tones. Neither this scheduling nor activation may be expected on this SCC, but the SCC may serve for rate matching purposes. In this manner, the UE may be configured with a frequency overlapping SCC cell for the purpose of configuring an additional CRS rate matching pattern that overlaps with the neighboring LTE cell CRS pattern. In such cases, the UE or BS may implicitly apply rate-matching for PDSCH scheduled on PCC following the rate-matching patterns defined on PCC and SCC.

As described herein, ZP and NZP resources may be used for CRS rate matching. In such cases, the network may not configure rate matching ZP/NZP resources in case there is potential interference to a PDSCH in those REs. The rate matching configurations may be triggered, for example, via DCI or MAC CE. A UE may ignore those REs corresponding to the interference REs (as indicated per the ZP/NZP resource configuration). In some cases, current standard constraints may be relaxed to provide greater flexibility in covering LTE CRS patterns. In some cases, multiple LTE CRS rate matching patterns may be used (and dynamically triggered), for example, to adapt to a changing environment.

Example CRS Interference Detection

As noted above, a network entity may detect an interfering entity (e.g., a dominant interfering neighbor) and corresponding LTE CRS patterns to trigger rate matching. In some cases, detection of one or more dominant interfering entities be used to trigger one or more rate matching patterns, allowing for semi-static or dynamic PDSCH rate matching, based on the detected interference.

Aspects of the present disclosure provide various mechanisms that may help support such CRS interference detection.

For example, according to a first option, a UE may be configured with an additional CSI report configuration. In this case, a reference CSI report can be configured with a CSI interference measurement (IM) on a Multimedia Broadcast multicast service Single Frequency Network (MBSFN) slot or where no CRS is present. An additional CSI report may also be configured with the same NZP-CSI-RS as the reference report or a separately configured NZP-CSI-RS for channel measurement (a channel measurement resource or CMR). According to a first pattern (Pattern 0), a CSI-IM resource may overlap with a subset of potential interfering cell CRS REs on non-MBSFN slots. In such cases, rate matching (RM) around CSI-IM resource may be applied.

To detect LTE CRS, the network (NW) may compare a channel quality indicator (CQI)/rank indicator (RI) report from the additional CSI report with the reference CSI report (or other reference estimate) to detect the presence of interfering LTE CRS. Upon interference detection, the network entity (e.g., gNB) may apply PDSCH RM to all or some of the candidate NR PDSCH REs located within LTE CRS symbols per the placement of CRS-IM resources with respect to the possible locations of LTE CRS resources placement.

According to a second option, radio resource management (RRM) neighbor cell measurement may be used. In this case, the network may configure NR measurements to measure LTE inter-RAT (IRAT) cells signal strength (e.g., reference signal received power or RSRP). The NW may use this report to apply RM for the strongest reported LTE neighbor (or neighbors) with a vShift different from serving LTE cell (where the parameter vShift indicates RE location of the LTE CRS).

A UE may be configured to perform NR measurements to measure neighbor NR cells. The NW can map the reported NR cells to dynamic spectrum sharing (DSS) LTE physical cell IDs (PCIs) and apply RM for LTE neighbor(s) with a vShift different from serving LTE cell.

In such cases, RM may be applied to a set of NR PDSCH REs corresponding to the locations of the LTE CRS REs of the strongest interfering entity or entities where interference is strongest or applied for all NR PDSCH REs located within the symbols containing neighbor cell LTE CRS REs.

A third option may be considered a combination of the first and second options, utilizing additional CSI and RRM. In this case, the network may detect the presence of CRS interference using the first option (additional CSI report) configuration and trigger RRM reporting per the second option. The network may then use the CSI report and RRM measurement report to apply rate matching. The RM may be applied to some or all NR PDSCH REs corresponding to LTE CRS symbols where interference is strongest.

According to a fourth option, an additional report with NZP-CSI-RS for interference measurement resource (IMR) may be configured. In this case, a reference CSI report may be configured with CSI-IM on MBSFN slot or where no CRS is present. An additional CSI report (or reports) may be configured with the same NZP CMR resource as the reference report or a separately configured resource for CMR. Each additional report may be configured to have NZP-CSI-RS for interference measurement that can be configured to overlap with a subset of candidate LTE CRS REs of a particular vShift other than the vShift of serving LTE CRS.

The NW may compare the CQI/RI report from the additional CSI reports with the reference CSI report to detect the presence of interfering LTE CRS for each vShift. Upon interference detection, the network (e.g., gNB) may apply PDSCH RM to some or all NR PDSCH REs corresponding to LTE CRS symbols with strongest interference.

As illustrated by the CRS patterns (e.g., of 4 ports) shown in FIG. 4C, depending on the number of eNB antennas the number of CRS REs may vary in a CRS symbol.

FIG. 13 illustrates example CSI interference management (CSI-IM) patterns that could be configured, in accordance with some aspects of the present disclosure. As illustrated, one pattern (labeled Pattern 0) may capture one or two REs with LTE CRS interference from neighbor cells in every RB, depending on the number of CRS ports, and CSI-IM placement. The network may configure CSI-IM such that it does not capture LTE serving cell CRS power. Pattern 0 may be more useful than a second pattern (labeled Pattern 1), since Pattern 1 may always captures the serving cell CRS power for multi-port CRS, when placed in CRS symbol.

Example Aspects

Aspect 1: A method for wireless communications by a user equipment (UE), comprising receiving, from a network entity of a first radio access technology (RAT), signaling configuring the UE with channel state information (CSI) reference signals (RS) resources comprising at least one of zero power (ZP) or non-zero power (NZP) CSI-RS resources that align with resources of a cell specific reference (CRS) pattern of a second RAT, and performing rate matching for one or more physical downlink shared channel (PDSCH) transmissions based on the CSI-RS resources.

Aspect 2: The method of Aspect 1, wherein the rate matching is performed using resources of the first RAT for partial bandwidth of the second RAT, or an entire component carrier bandwidth of the second RAT.

Aspect 3: The method of any one of Aspects 1 and 2, wherein the CRS pattern is for at least one neighbor cell as at least one dominant interferer among neighbor cells.

Aspect 4: The method of any one of Aspects 1-3, wherein the CSI-RS resources comprise one or more resource sets of NZP CSI-RS resources, one or more resource sets of ZP CSI-RS resources, or one or more resource sets of both NZP CSI-RS and ZP CSI-RS resources.

Aspect 5: The method of Aspect 4, wherein the resource sets are configured with multiple slot periodicity as periodic or semi-persistent resources.

Aspect 6: The method of Aspect 5, wherein the NZP CSI-RS or ZP CSI-RS resources in the resource sets have different time domain and frequency domain placements to align with part of or all resource elements (REs) of the CRS pattern.

Aspect 7: The method of any one of Aspects 5 and 6, wherein the sets have multiple groups of resources with different slot offsets, and each group has multiple parts, with each part overlapping CRS resources of half of a frequency range spanned by the CRS pattern, and each part comprises multiple single port ZP resources, each having a different symbol and resource element (RE) allocation to match the neighbor cell LTE CRS pattern.

Aspect 8: The method of Aspect 6, wherein the ZP CSI-RS resources comprise single port aperiodic ZP CSI-RS resources.

Aspect 9: The method of any one of Aspects 4 and 5, wherein the UE is also configured with one or more resource blocks (RBs) for rate matching and the UE also performs rate matching around the configured RBs.

Aspect 10: The method of any one of Aspects 4-10, wherein the UE is configured with at least first and second sets of ZP CSI-RS resources.

Aspect 11: The method of Aspect 10, wherein the first and second sets of ZP CSI-RS resources comprise same or different numbers of ZP CSI-RS resources.

Aspect 12: The method of any one of Aspects 10 and 11, further comprising receiving, from the network entity, signaling to trigger at least one of the first or second set of ZP CSI-RS resources.

Aspect 13: The method of Aspect 12, wherein the signaling comprises at least two bits, wherein a first value of the at least two bits triggers the first set of ZP CSI-RS resources, a second value of the at least two bits triggers the second set of ZP CSI-RS resources, and a third value of the at least two bits triggers both the first and second sets of ZP CSI-RS resources.

Aspect 14: The method of any one of Aspects 10-13, wherein a maximum number of ZP CSI-RS resources for each set is at least 32, and a maximum total number of ZP CSI-RS resources is at least 64.

Aspect 15: The method of any one of Aspects 1-14, wherein the UE is configured with multiple CRS rate matching patterns, and the method further comprises receiving, from the network entity, signaling to trigger at least one of the multiple CRS rate matching patterns, wherein the signaling is based on one or more strongest interfering neighbor cells Aspect 16: The method of Aspect 15, wherein the signaling comprises signaling for periodic triggering, semi-persistent triggering, or aperiodic triggering.

Aspect 17: The method of any one of Aspects 1-16, wherein the UE is configured with a primary component carrier (PCC) and a secondary component carrier (SCC), and the UE is configured with one of the configurations for the SCC to align with up with the CRS pattern.

Aspect 18: A method for wireless communications by a user equipment (UE), comprising receiving, from a network entity of a first radio access technology (RAT), signaling configuring the UE with multiple cell specific reference (CRS) rate matching patterns for a second RAT, receiving, from the network entity, signaling to trigger at least one of the multiple CRS rate matching patterns, and performing rate matching for one or more physical downlink shared channel (PDSCH) transmissions based on the triggered at least one CRS rate matching pattern.

Aspect 19: The method of Aspect 18, wherein the signaling is based on one or more strongest interfering neighbor cells.

Aspect 20: The method of Aspect 19, further comprising receiving signaling configuring the UE to report measurements to allow the network entity of the first RAT to detect the one or more strongest interfering neighbor cells.

Aspect 21: The method of Aspect 20, wherein rate matching is applied based on at least one of UE measurements or CSI reports to a subset or all of first RAT PDSCH resource elements (REs) corresponding to symbols containing second RAT CRS REs from neighboring cells.

Aspect 22: The method of any one of Aspects 20 and 21, wherein the signaling configures the UE for a reference channel state information (CSI) report configured with CSI interference measurement (CSI-IM) not overlapping with CRS resources of neighboring second RAT cells or other reference measurement, and an additional CSI report configured with CSI-IM resource placed where CRS interference from second RAT is expected to occur.

Aspect 23: The method of any one of Aspects 21-22, wherein the signaling configures the UE to report radio resource management (RRM) neighbor cell measurement.

Aspect 24: The method of any one of Aspects 21-23, wherein the signaling configures the UE for a reference channel state information (CSI) report configured with CSI interference measurement (CSI-IM) not overlapping with CRS resources of neighboring second RAT cells or other reference measurement and an additional CSI report configured with CSI-IM resource placed where CRS interference from second RAT is expected to occur, and rate matching is applied based on the detection and radio resource management (RRM) neighbor cell measurement.

Aspect 25: The method of any one of Aspects 21-24, wherein the signaling configures the UE with a reference channel state information (CSI) report configured with CSI interference measurement (CSI-IM) not overlapping with CRS resources of neighboring second RAT cells or other reference measurement, and an additional CSI report or multiple reports configured for channel measurement with NZP-CSI-RS for IMR having resources overlapping with one or more REs that may contain interference from neighboring second RAT cells CRS REs.

Aspect 26: The method of any one of Aspects 18-25, wherein the signaling comprises signaling for periodic triggering, semi-persistent triggering, or aperiodic triggering.

Aspect 27: The method of any one of Aspects 18-26, the UE is configured with a primary component carrier (PCC) and a secondary component carrier (SCC), and the UE is configured with one of the configurations for the SCC to align with up with the CRS pattern.

Aspect 28: A method for wireless communications by a network entity of a first radio access technology (RAT), comprising determining a cell specific reference (CRS) pattern for at least one neighbor cell of a second RAT, configuring a user equipment (UE) with channel state information (CSI) reference signals (RS) resources comprising at least one of zero power (ZP) or non-zero power (NZP) CSI-RS resources that align with resources of the CRS pattern, and performing rate matching for one or more physical downlink shared channel (PDSCH) transmissions to the UE based on the CSI-RS resources.

Aspect 29: A method for wireless communications by a network entity of a first radio access technology (RAT), comprising configuring a user equipment (UE) with multiple cell specific reference (CRS) rate matching patterns for a second RAT, determining a change in environment, sending the UE signaling to trigger at least one of the multiple CRS rate matching patterns based on the determination, and performing rate matching for one or more physical downlink shared channel (PDSCH) transmissions to the UE based on the triggered at least one CRS rate matching pattern.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplexing (TDD). In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), the method comprising:
    receiving, from a network entity of a first radio access technology (RAT), signaling configuring the UE with multiple cell specific reference signal (CRS) rate matching patterns for a second RAT;
    receiving, from the network entity, signaling configuring the UE to report measurements to allow the network entity of the first RAT to detect one or more strongest interfering neighbor cells for a reference channel state information (CSI) report configured with CSI interference measurement (CSI-IM) resources not overlapping with CRS resources of neighboring cells of the second RAT;
    receiving, from the network entity, signaling to trigger at least one of the multiple CRS rate matching patterns; and
    performing rate matching for one or more physical downlink shared channel (PDSCH) transmissions from the network entity of the first RAT based on the triggered at least one CRS rate matching pattern.

2. The method of claim 1, wherein the signaling to trigger at least one of the multiple CRS rate matching patterns is based the on one or more strongest interfering neighbor cells.

3. The method of claim 1, wherein performing the rate matching comprises performing the rate matching, based on at least one of: UE measurements or channel state information (CSI) reports, for a subset or all of resource elements (REs), of the one or more PDSCH transmissions, corresponding to symbols containing REs of CRS transmitted from neighboring cells of the second RAT.

4. The method of claim 1, wherein the signaling configuring the UE to report measurements configures the UE for an additional CSI report configured with CSI-IM resources placed where CRS interference from the second RAT is expected to occur.

5. The method of claim 1, wherein the signaling configuring the UE to report measurements configures the UE to report radio resource management (RRM) neighbor cell measurements.

6. The method of claim 1, wherein:
the signaling configuring the UE to report measurements configures the UE for:
a reference channel state information (CSI) report configured with CSI interference measurement (CSI-IM) resources not overlapping with CRS resources of neighboring cells of the second RAT or other reference measurements; and
an additional CSI report configured with CSI-IM resources placed where CRS interference from second RAT is expected to occur; and
performing the rate matching comprises performing the rate matching based on the detection and on radio resource management (RRM) neighbor cell measurements.

7. The method of claim 1, wherein the signaling configuring the UE to report measurements configures the UE with:
a reference channel state information (CSI) report configured with CSI interference measurement (CSI-IM) resources not overlapping with CRS resources of neighboring cells of the second RAT or other reference measurement; and
one or more additional CSI reports configured for channel measurement with non-zero power CSI reference signal (NZP-CSI-RS) resources for interference management resources (IMR) overlapping with one or more REs that potentially contain interference from CRS REs of the neighbor cells of the second RAT.

8. The method of claim 1, wherein the signaling to trigger at least one of the multiple CRS rate matching patterns comprises signaling for periodic triggering, semi-persistent triggering, or aperiodic triggering.

9. The method of claim 1, wherein:
the UE is configured with a primary component carrier (PCC) and a secondary component carrier (SCC); and
at least one of the multiple rate matching configurations is configured for the SCC and overlaps with the CRS pattern of the second RAT.

10. The method of claim 9, wherein the SCC has a same NR absolute radio frequency channel number (ARFCN) as the PCC.

11. The method of claim 9, wherein performing the rate matching comprises performing resource element (RE) level rate matching for a PDSCH transmission on the PCC based on at least one triggered CRS rate matching pattern for the PCC and at least one triggered CRS rate matching pattern for the SCC.

12. A method for wireless communications by a network entity of a first radio access technology (RAT), the method comprising:
configuring a user equipment (UE) with multiple cell specific reference signal (CRS) rate matching patterns for a second RAT wherein the first RAT is a new radio (NR) RAT and the second RAT is a long term evolution (LTE) RAT and wherein the CRS rate matching pattern of the second RAT comprises a pattern of non-colliding interfering LTE CRS resource elements (REs) of the second RAT;
determining a change in environment;
sending the UE signaling to trigger at least one of the multiple CRS rate matching patterns based on the determination; and
performing rate matching for one or more physical downlink shared channel (PDSCH) transmissions to the UE based on the triggered at least one CRS rate matching pattern.

13. The method of claim 12, wherein the configuring the multiple rate matching patterns comprises signaling a radio resource control (RRC) LTE-CRS-ToMatchAround information element (IE) comprising multiple RateMatchingPatternLTE-CRS parameters.

14. The method of claim 12, wherein the signaling to trigger at least one of the multiple CRS rate matching patterns is based on one or more strongest interfering neighbor cells.

15. The method of claim 14, further comprising:
configuring the UE to report measurements;
receiving one or more measurement reports from the UE; and
detecting the one or more strongest interfering neighbor cells based on the one or more measurement reports.

16. The method of claim 15, wherein performing the rate matching comprises performing the rate matching, based on at least one of: UE measurements or channel state information (CSI) reports, for a subset or all of resource elements (REs) of the one or more PDSCH transmissions corresponding to symbols containing REs of CRS transmitted from neighboring cells in the second RAT.

17. The method of claim 15, wherein the configuring the UE to report measurements configures the UE for:
a reference channel state information (CSI) report configured with CSI interference measurement (CSI-IM) resources not overlapping with CRS resources of neighboring cells of the second RAT or other reference measurements; and
an additional CSI report configured with CSI-IM resources placed where CRS interference from the second RAT is expected to occur.

18. The method of claim 15, wherein the configuring the UE to report measurements configures the UE to report radio resource management (RRM) neighbor cell measurements.

19. The method of claim 15, wherein:
the configuring the UE to report measurements configures the UE for:
a reference channel state information (CSI) report configured with CSI interference measurement (CSI-IM) resources not overlapping with CRS resources of neighboring cells of the second RAT or other reference measurements; and
an additional CSI report configured with CSI-IM resources placed where CRS interference from second RAT is expected to occur; and
performing the rate matching comprises performing the rate matching based on the detection and on radio resource management (RRM) neighbor cell measurements.

20. The method of claim 15, wherein the configuring the UE to report measurements configures the UE with:
a reference channel state information (CSI) report configured with CSI interference measurement (CSI-IM) resources not overlapping with CRS resources of neighboring cells of the second RAT or other reference measurement; and
one or more additional CSI reports configured for channel measurement with non-zero power CSI reference signal (NZP-CSI-RS) resources for interference management resources (IMR) overlapping with one or more REs that potentially contain interference from CRS REs of the neighbor cells of the second RAT.

21. The method of claim 12, wherein the signaling to trigger at least one of the multiple CRS rate matching patterns comprises signaling for periodic triggering, semi-persistent triggering, or aperiodic triggering.

22. The method of claim 12, wherein:
the UE is configured with a primary component carrier (PCC) and a secondary component carrier (SCC); and
at least one of the multiple rate matching configurations is configured for the SCC and overlaps with the CRS pattern of the second RAT.

23. The method of claim 22, wherein the first RAT is a new radio (NR) RAT and the second RAT is a long term evolution (LTE) RAT, and wherein the SCC has a same NR absolute radio frequency channel number (ARFCN) as the PCC.

24. The method of claim 23, wherein the CRS pattern of the second RAT comprises a pattern of non-colliding interfering LTE CRS REs of the second RAT.

25. The method of claim 24, wherein the configuring the multiple rate matching patterns comprises signaling a radio resource control (RRC) lte-CRS-ToMatchAround information element (IE) comprising multiple RateMatchingPatternLTE-CRS parameters.

26. A user equipment (UE) comprising:
one or more processors configured to, individually or collectively, execute computer executable code and cause the UE to:
receive, from a network entity of a first radio access technology (RAT), signaling configuring the UE with multiple cell specific reference signal (CRS) rate matching patterns for a second RAT;
receive signaling configuring the UE to report measurements to allow the network entity of the first RAT to detect one or more strongest interfering neighbor cells for a reference channel state information (CSI) report configured with CSI interference measurement (CSI-IM) resources not overlapping with CRS resources of neighboring cells of the second RAT;
receive, from the network entity, signaling to trigger at least one of the multiple CRS rate matching patterns; and
performing rate matching for one or more physical downlink shared channel (PDSCH) transmissions from the network entity of the first RAT based on the triggered at least one CRS rate matching pattern.

27. A network entity of a first radio access technology (RAT), the network entity comprising:
one or more processors configured to, individually or collectively, execute computer executable code and cause the network entity to:
configure a user equipment (UE) with multiple cell specific reference signal (CRS) rate matching patterns for a second RAT wherein the first RAT is a new radio (NR) RAT and the second RAT is a long term evolution (LTE) RAT and wherein the CRS rate matching pattern of the second RAT comprises a pattern of non-colliding interfering LTE CRS resource elements (REs) of the second RAT;
determine a change in environment;
send the UE signaling to trigger at least one of the multiple CRS rate matching patterns based on the determination; and
perform rate matching for one or more physical downlink shared channel (PDSCH) transmissions to the UE based on the triggered at least one CRS rate matching pattern.

\* \* \* \* \*